L. RENAULT.
DETACHABLE WHEEL.
APPLICATION FILED JAN. 29, 1913.
1,168,673.
Patented Jan. 18, 1916.
3 SHEETS—SHEET 3.
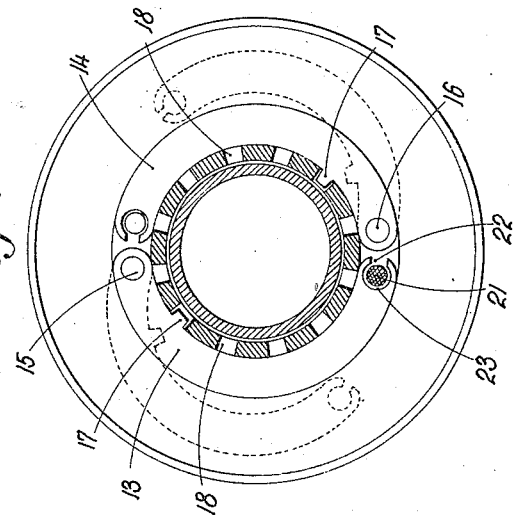
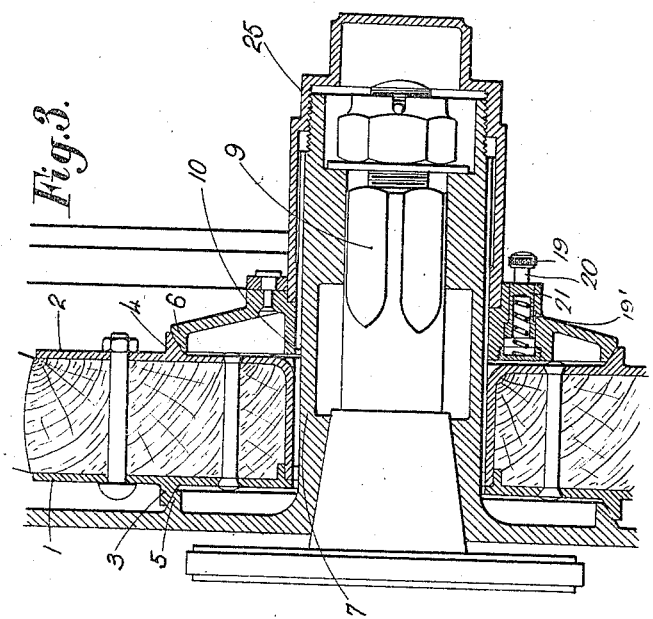
Witnesses.
Inventor.

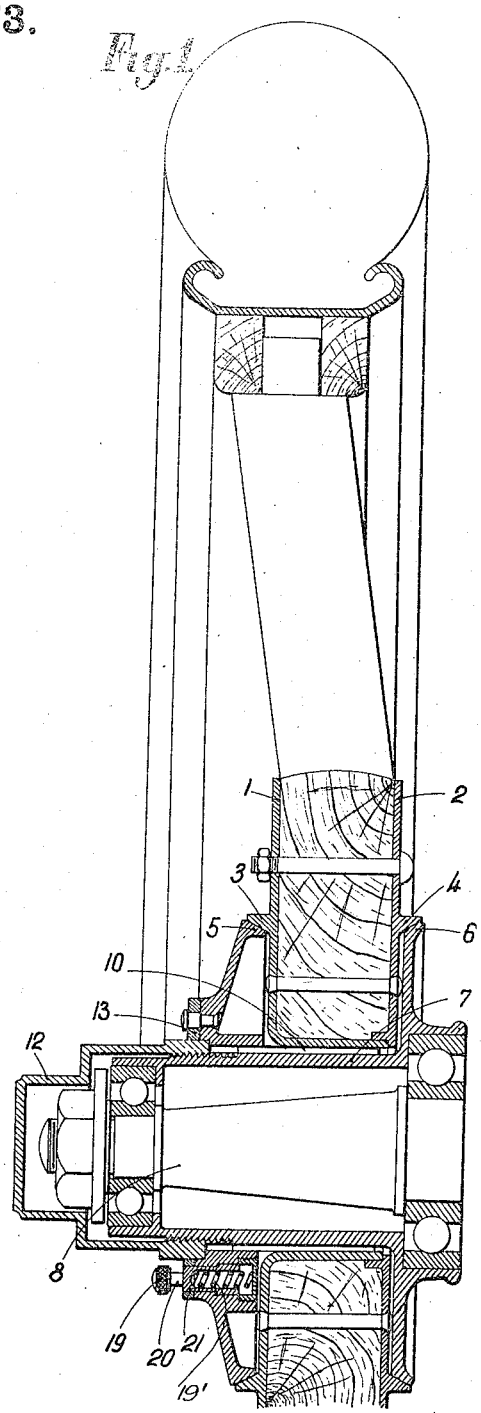

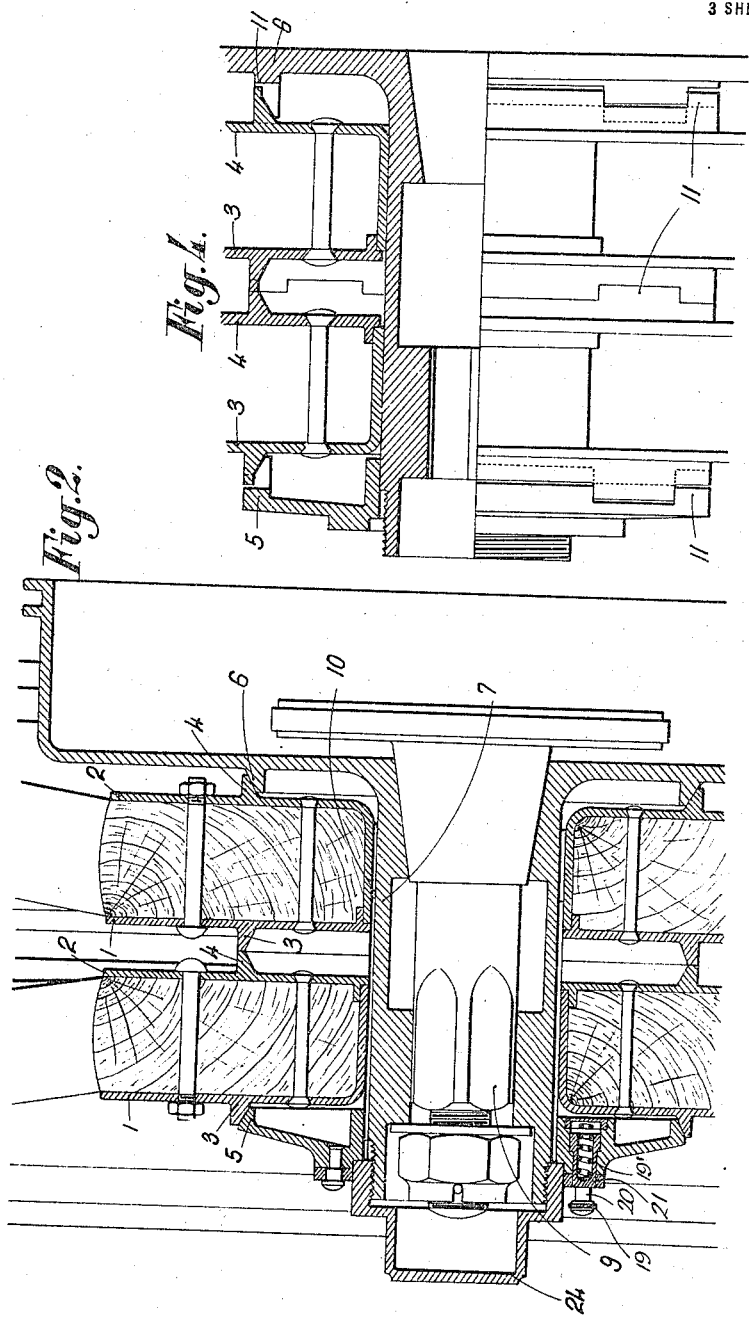

UNITED STATES PATENT OFFICE.

LOUIS RENAULT, OF BILLANCOURT, FRANCE.

DETACHABLE WHEEL.

1,168,673.  Specification of Letters Patent.  Patented Jan. 18, 1916.

Application filed January 29, 1913. Serial No. 744,886.

*To all whom it may concern:*

Be it known that I, LOUIS RENAULT, citizen of the French Republic, residing at Billancourt, Department of the Seine, in France, have invented certain new and useful Improvements in Detachable Wheels; and I do hereby declare the following to be a full, clear, and exact description of the invention, such as will enable others skilled in the art to which it appertains to make and use the same.

The invention relates to detachable wheels which can be readily mounted and detached from a false hub carried by the axle spindle.

The object of the invention is to provide means for centering the wheel as it is applied to the axle, such means preferably taking the form of coöperating beveled surfaces on the wheel and on the false hub. This arrangement is particularly applicable to the formation of twin wheels and renders it possible to change from the single wheel to the twin wheel and vice versa in a few moments.

Various embodiments of the invention are illustrated by way of example in the accompanying drawing, in which:—

Figure 1 shows a single wheel mounted upon a hub, in accordance with the invention; Fig. 2 represents a twin wheel constituted by two single wheels coupled together; Fig. 3 represents the same hub as in Fig. 2, but with a single wheel instead of a twin wheel applied thereto; Fig. 4 represents a modification; Fig. 5 shows a detail of the device for locking the cap.

In all of the forms, the detachable wheel comprises a hub formed by two cheeks 1, 2, between which the spokes are mounted. The cheeks 1, 2, are provided with annular or annularly disposed interiorly beveled members or projections 3, 4 of the same diameter which seat upon the beveled surfaces of plates 5, 6 of corresponding size carried by the false hub 7 which is connected in the usual manner with the spindle 8 or the wheel axle 9.

The connection between the false hub and the detachable wheel is effected for example by means of grooves and channels 10, as shown in Figs. 1 and 2, or else by means of notches 11 formed in the annular projections 3, 4 and in the plates 5, 6, as shown in the modification illustrated in Fig. 4.

The wheel is fitted in the following manner: The detachable wheel is passed onto the false hub until the beveled surface of the inner annular projection 4 of the wheel seats upon the corresponding beveled surface of the plate 6 on the false hub; the outer plate 5 is then placed in position. A nut or wheel cap 12 is then screwed on the threaded portion on the false hub 7 and this cap is locked in such a manner as to assemble the plate 6, the detachable wheel, the plate 5 and the cap 12 in locked relation. In order to prevent the unscrewing of this cap, any convenient method of locking may be employed. Figs. 1 and 5 show by way of example an arrangement consisting of two arcuate members 13, 14 pivoted at the fixed points 15, 16. Projections 17 are provided on said members which are adapted to enter corresponding notches 18 formed in the cap 12. The displacement of the members 13, 14 is prevented by means of pins 19 having a portion of relatively small diameter 20 and a portion 21 of larger diameter corresponding respectively to the passage 22 and to the opening 23 in the extremity of the arcuate members. These pins are pressed outward by springs 19', in which position the relative large portion 21 of the pins engages in and fits the openings 23 in the arcuate members. To detach the wheel, it is only necessary to press the pin inward to bring the portion of small diameter 20 in line with the passage 22, thereby enabling the bolt to be swung around its pivot. In the case of twin wheels, the outer projection 3 of the inner wheel is fitted to the inner projection of the outer wheel in such a manner that the spokes present inverse and symmetrical inclinations, as shown in Fig. 2. If the annular projections are provided with notches, the latter fit each other, as shown in Fig. 4. The entire construction is locked by means of a wheel cap 24 held in the manner already described. When it is desired to remove the twin wheel and replace it by a single wheel, it is only necessary to replace the cap 24 by a cap 25 of greater length, as shown in Fig. 3.

What I claim is:—

The combination with the hub of a wheel, of a detachable wheel proper having a central hub opening, said wheel provided on its opposite faces with circularly-disposed internally-beveled seating projections of equal diameter and disposed radially distant from said hub opening, said hub provided with a circularly-disposed beveled surface of a relatively large diameter compared to the diameter of the hub and upon which the projection on one side of the wheel is adapted to seat, a disk-like detachable member associated with said hub provided with a beveled surface of relatively large diameter compared to the diameter of the hub and upon which the projection on the opposite side of the wheel is adapted to seat, and a cap to hold said member in position, said member being independent of said cap and adapted to be positioned before the cap is positioned.

In testimony whereof I affix my signature, in presence of two witnesses.

LOUIS RENAULT.

Witnesses:
 HANSON C. COXE,
 EMILE KLOTZ.